United States Patent [19]

Garbini et al.

[11] Patent Number: 4,814,691

[45] Date of Patent: Mar. 21, 1989

[54] FRINGE FIELD CAPACITIVE SENSOR FOR MEASURING PROFILE OF A SURFACE

[75] Inventors: Joseph L. Garbini, Federal Way, Wash.; Laurence J. Albrecht, Colorado Springs, Colo.; Jens E. Jorgensen; Georg F. Mauer, both of Seattle, Wash.

[73] Assignee: Washington Research Foundation, Seattle, Wash.

[21] Appl. No.: 764,164

[22] Filed: Aug. 9, 1985

[51] Int. Cl.⁴ ............................................. G01R 27/26
[52] U.S. Cl. .................................. 324/61 R; 324/61 P
[58] Field of Search .......................... 324/61 R, 61 P; 340/870.37

[56] References Cited

U.S. PATENT DOCUMENTS

| | | | |
|---|---|---|---|
| 2,802,178 | 8/1957 | Shafer et al. | 324/61 R |
| 3,400,331 | 9/1968 | Harris | 324/61 R |
| 3,504,279 | 3/1970 | Foster et al. | 324/61 R |
| 3,771,051 | 11/1973 | Abbe | 324/61 |
| 3,805,150 | 4/1974 | Abbe | 324/61 |
| 3,842,194 | 10/1974 | Clemens | 178/6.6 |
| 3,867,691 | 2/1975 | Plessis | 324/61 R |
| 3,984,767 | 10/1976 | Denton et al. | 324/61 |
| 4,103,226 | 7/1978 | Fromson et al. | 324/61 |
| 4,112,355 | 9/1978 | Gibson, Jr. et al. | 324/61 R X |
| 4,152,641 | 5/1979 | Hughes et al. | 324/61 |
| 4,168,465 | 9/1979 | Prince | 324/61 P |
| 4,295,092 | 10/1981 | Okamura | 324/61 R |
| 4,296,371 | 10/1981 | Keizer et al. | 324/61 |
| 4,352,060 | 9/1982 | Garpendahl | 324/61 R |
| 4,422,035 | 12/1983 | Risko | 324/61 |
| 4,481,616 | 11/1984 | Matey | 369/126 X |

FOREIGN PATENT DOCUMENTS

| | | |
|---|---|---|
| 2920491 | 1/1980 | Fed. Rep. of Germany . |
| 1436698 | 5/1976 | United Kingdom . |
| 2100441A | 12/1982 | United Kingdom . |
| 2150304A | 12/1984 | United Kingdom . |

OTHER PUBLICATIONS

S. Y. Lee, "Variable Capacitance Signal Transduction and the Comparison With Other Transduction Schemes", *Fundamentals of Aerospace Instrumentation*, vol. 3, May, 1970.

Clemens et al., The Early Days of the "CED" System, Nov./Dec. 1981, pp. 4–9, RCA Engineer.

Crooks, The RCA "SelectaVision Video Disc System", Nov./Dec. 1981, pp. 10–12 RCA Engineer.

Workman et al., Video Disc Player Design—An Overview, Nov./Dec. 1981, pp. 14–15.

Hackett et al., The Video Disc Groove-Riding Stylus Cartridge, Nov./Dec. 1981, pp. 26–29, RCA Engineer.

Gibson et al., Nonlinear Aperture Correction in the RCA Video Disc Player, Nov./Dec. 1981, pp. 38–39, RCA Engineer.

*Primary Examiner*—Reinhard J. Eisenzopf
*Assistant Examiner*—Jack B. Harvey
*Attorney, Agent, or Firm*—Christensen, O'Connor, Johnson & Kindness

[57] ABSTRACT

A fringe field, capacitive distance sensor for measuring the distance between a probe and the surface of the conductive body. The sensor comprises a conductive plate element mounted by the probe, the thickness of the plate element being substantially less than the height and width of the plate element. The plate element is positioned adjacent to and normal to the body surface, and the fringe field capacitance between the plate element and the body is measured, to thereby determine the distance between the probe and the body surface. The probe may be in contact with and scanned across the body surface, to provide surface profile measurements. A probe including a plurality of plate elements may be positioned inside an opening such as a hole, to measure the geometry of the hole. By maintaining the hole probe adjacent one electrode in electrode in contact with the hole wall, both profile and geometry measurements may be made. A noncontacting probe including one or more plate elements may be used to measure surface topography.

35 Claims, 8 Drawing Sheets

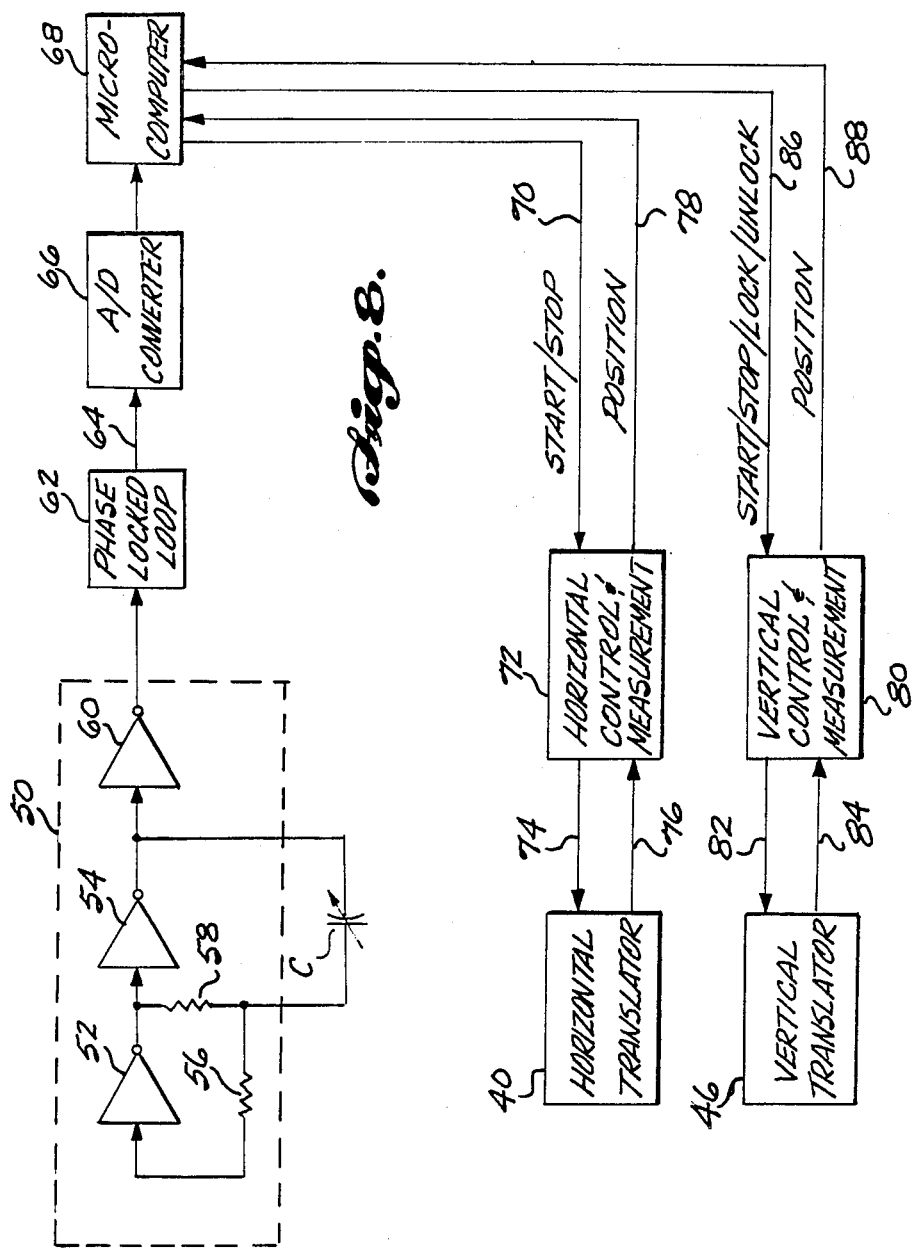

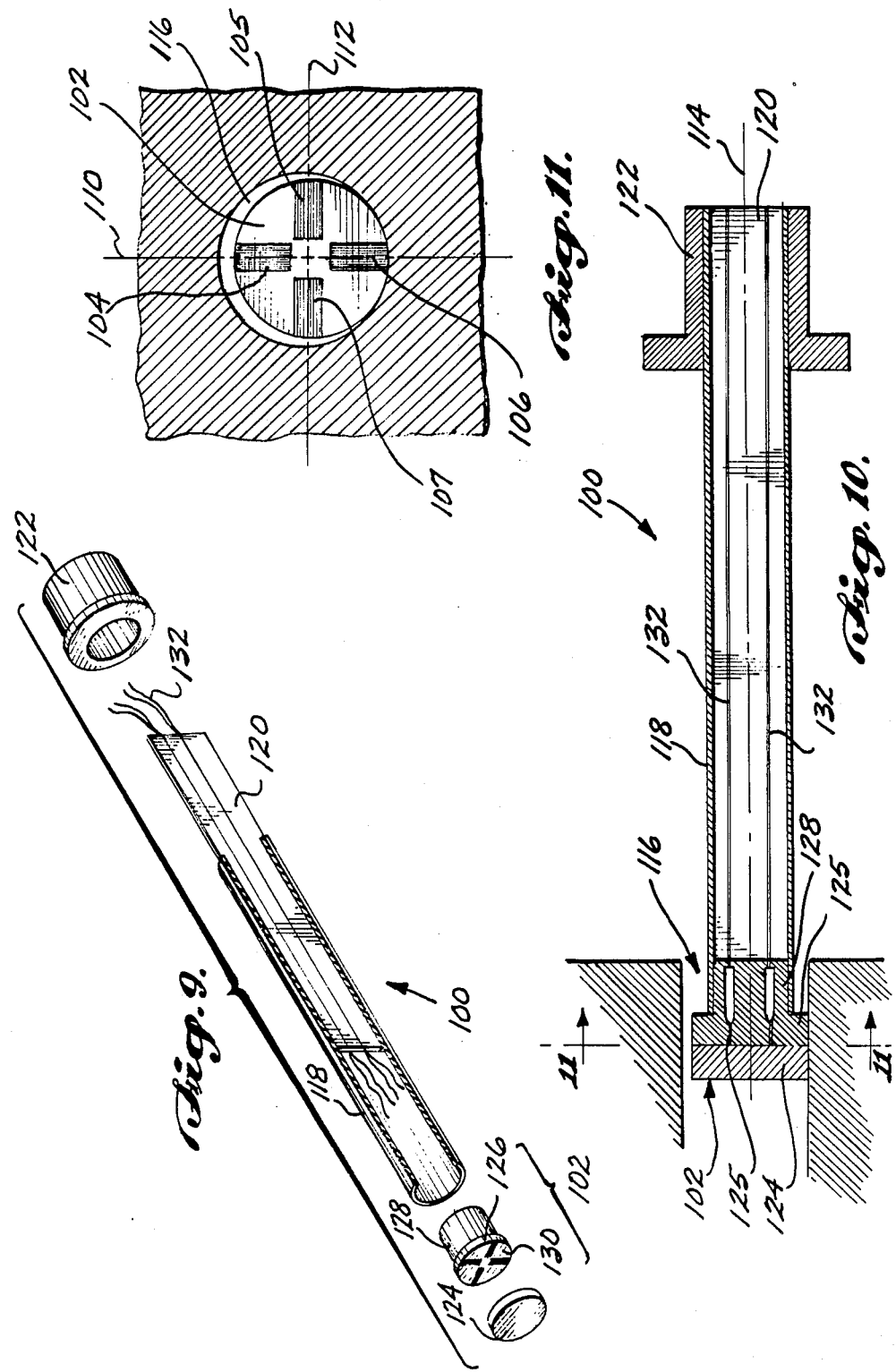

FRINGE FIELD CAPACITIVE SENSOR FOR MEASURING PROFILE OF A SURFACE

FIELD OF THE INVENTION

The present invention relates to an apparatus and method for measuring the distance between a probe and the surface of a body. Applications of the invention include the measurement of surface profile, hole geometry and surface topography.

BACKGROUND OF THE INVENTION

Many of the advantages gained through automated manufacturing are quickly lost when the speed of inspection is inadequate to keep pace with production. One important class of inspection procedures consists of dimensional measurements, for example measurement of the finish or geometry required in manufacturing of a surface. Finish refers to the roughness or small scale height variations of a surface, whereas geometry refers to the macroscopic characteristics of the surface. In-process inspection procedures based upon the measurement of such dimensions must be designed to survive in a comparatively harsh environment without sacrificing dynamic range, accuracy, or speed.

The inspection and quality control of drilled holes is of a special concern to certain industries, such as the aircraft industry. The diameter, finish and shape of holes drilled for fasteners in aircraft manufacturing must meet exceptionally high tolerances, because the fit of the fastener in the hole is critical to the strength and fatigue life of the joint. This is particularly true where the components are high-strength aluminum alloys, which are often fairly brittle and therefore notch sensitive. A commercial jet aircraft may contain a million drilled holes, and the inspection of all such holes by conventional techniques is impractical. Currently, inspection procedures typically rely on statistical inference based upon the inspection of a certain fraction of the holes. However, even such partial inspection is time consuming, and depends to a considerable extent upon the skill and experience of the inspector.

Prior surface finish measurement techniques may be divided into two classes: (1) those which measure or infer only average roughness and, (2) those which record the surface profile, i.e., the local height of the surface as a function of distance along the surface. Although often more difficult to obtain, the surface profile provides substantially more information than average roughness alone. Higher order statistics, such as skewness, kurtosis, and surface spectra can be computed from the profile record, but not from the value of the average roughness. In addition, profile measurements are usually necessary for reliable detection of individual cracks and tool gouges. The average roughness measurement from a surface containing an isolated surface defect is often indistinguishable from that of a surface containing uniform roughness of equivalent value.

The stylus-type profilometer is the device most commonly used to measure profile and average roughness. However, there are limitations to the in-process application of stylus profilometers. To measure profile, the stylus tip must mechanically follow the vertical height variations as the stylus is moved across the surface, and scanning speeds must therefore be relatively slow. In addition, the stylus tip suspension is fragile and is easily damaged.

Recently a variety of optical surface measurement techniques have been developed. These are noncontacting systems and have potentially high scanning speeds. Some are capable of profile measurements, as well as average roughness estimates. Disadvantages of these techniques are the potential complexity of the optical apparatus (light source, optics, alignment devices, detectors), and the possibility of errors due to contamination by cutting fluids and metal particles.

A pneumatic technique has also been used to measure surface finish. In this approach, a close-fitting sensor is placed against a machined surface and air is allowed to flow between the sensor and the surface. The pressure required to sustain a fixed flow rate is related to the characteristics of the surface finish. This method is limited to the measurement of average surface roughness, and has comparatively poor time response.

Known capacitive surface finish gauges use a wide, flexible metal electrode located parallel to and in close proximity with a conducting surface to be measured. The capacitance generated between these two conductors is inversely proportional to the average roughness of the surface. The sensor is rugged and the method is well suited to the manufacturing environment. However, only average roughness can be measured.

The most common hole geometry measurement system employed in industry is the air gauge. An air gauge consists of a close tolerance rod inserted inside the hole to be measured. Compressed air is then allowed to flow through small holes around the rod. By monitoring the airflow, the diameter of the hole can be determined. However, the response time of this system is slow, and hence it is not suitable for automated inspection systems.

There are other more exotic ways to measure the geometry of a hole, for example by means of strain gauges or by optical measurement. In both cases, the required apparatus is bulky, and the instruments perform best under laboratory conditions. A capacitive hole probe system has been developed that consists of a rod of approximately the size of the hole, with small capacitive plates attached along and around the axis of the probe. The hole wall serves as the opposing side of the capacitor plate. The capacitance created by each plate can then be translated into the distance between the probe and the hole at various circumferential locations. Unfortunately, such a probe can only measure the average surface roughness rather than the surface profile, and local scratches cannot be detected by such a system.

SUMMARY OF THE INVENTION

The present invention provides capacitive distance sensors that are capable of distance measurements over a wide range, e.g., 0.1–2,000 microns. The sensors may be encased in ceramic material, and are characterized by small size, fast response and rugged construction. As such, they are well-suited for applications in automated manufacturing and in-process measurements. They can be applied individually or in groups to form multi-channel sensor systems. The sensors are based upon measurement of the capacitance resulting from the fringe field between a body surface and an electrode perpendicular to the surface. Unlike prior, parallel-plate capacitive sensors, the sensors of the present invention are characterized by exceptional spatial resolution, and are capable of providing surface profile as well as surface roughness.

In one aspect, the present invention provides an apparatus and method for measuring the distance between the apparatus and a surface of a conductive body. The apparatus comprises a probe and a conductive plate element mounted by the probe, the thickness of the plate element being substantially less than the height and width of the plate element. The apparatus also includes positioning means for positioning the probe adjacent the body surface such that the plate element is normal to the body surface, and means for measuring the fringe field capacitance between the plate element and the body, to thereby measure the distance between the probe and the body surface.

For the measurement of surface profile, the probe may have one end shaped to form a skid surface adapted to move across the body surface in contact therewith. In such an embodiment, the positioning means includes means for mounting the probe such that the skid surface contacts the body surface, and means for causing relative movement between the probe and the body such that skid surface moves in a scanning direction across the body surface, the scanning direction being normal to the plate element. The measurement means comprises means for determining the position of the probe along the scanning direction, and means for measuring the fringe field capacitance between the plate element and the body at a plurality of probe positions along the scanning direction. Such measurements provide a measured profile of the body surface along the scanning direction. Dynamic compensation means may be used for processing the measured profile to produce an estimate of the actual profile.

In another aspect, the present invention provides an apparatus and method for measuring the size of an opening in a conductive body along a measurement direction. The apparatus comprises a probe having a probe axis and adapted to be inserted in the opening, and two plate elements mounted by the probe, each plate element having a thickness substantially less than its height and width. The plate elements are spaced apart from one another in a direction normal to the probe axis. The apparatus further includes positioning means for positioning the probe such that the probe axis is approximately normal to the measurement direction, and such that the plate elements are within the opening and positioned adjacent to and normal to respectie body surfaces thereof. The body surfaces are spaced apart from one another along the measurement direction. The apparatus further includes measurement means for measuring the fringe field capacitance between each plate element and the body, to thereby determine the distance between each plate element and its respective body surface. Additional electrodes may be employed to measure the size of the opening along more than one measurement direction, and the probe may be moved in a scanning direction parallel to the probe axis to measure the size of the hole along the measurement directions as a function of position along the scanning direction. The probe may also be positioned and moved such that the probe adjacent one plate element is in contact with the respective body surface, to thereby measure both the surface profile and the geometry of the opening.

In another aspect, the present invention provides an apparatus and method for measuring the shape of a surface along a measurement direction. The apparatus comprises a probe, a plurality of conductive plate elements mounted by the probe, positioning means and measurement means. The thickness of each plate element is substantially less than the height and width of the plate element, and the plate elements are spaced from one another along the measurement direction. The positioning means positions the probe adjacent the surface such that the plate elements are normal to the surface. The measurement means measures the fringe field capacitance between each plate element and the body, to thereby measure the distance between each plate element and the body. The probe may be moved parallel to the surface in a scanning direction normal to the measurement direction, to thereby measure the shape of the surface at a plurality of positions along a scanning direction.

BRIEF DESCRIPTION OF THE DRAWINGS

FIG. 8 is a block diagram of the electronic components associated with the apparatus of FIG. 7;

FIG. 9 is an exploded and partially cut-away view of a hole sensor according to the present invention;

FIG. 10 is a cross-sectional view of the hole sensor of FIG. 9;

FIG. 11 is a cross-sectional view taken along line 11—11 of FIG. 10;

DETAILED DESCRIPTION OF THE INVENTION

Figure 1:
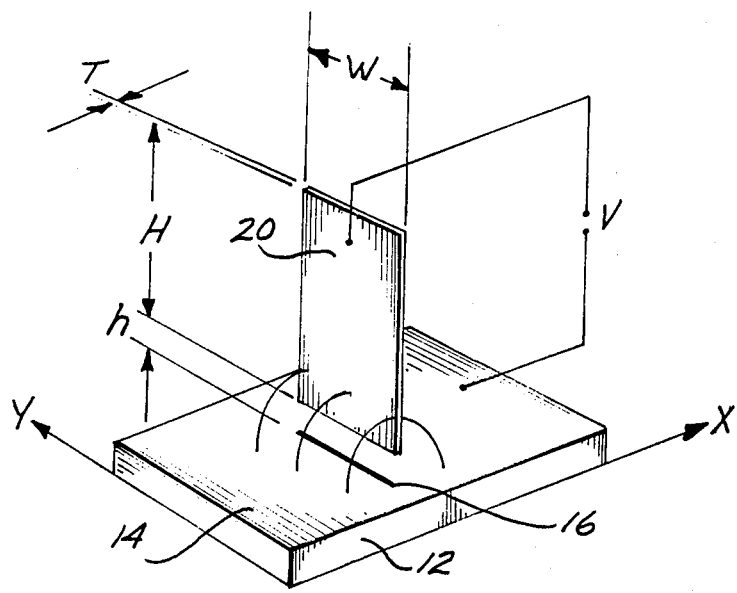
FIG. 1 is a schematic view illustrating the principle of operation of the present invention.
Figure 2:
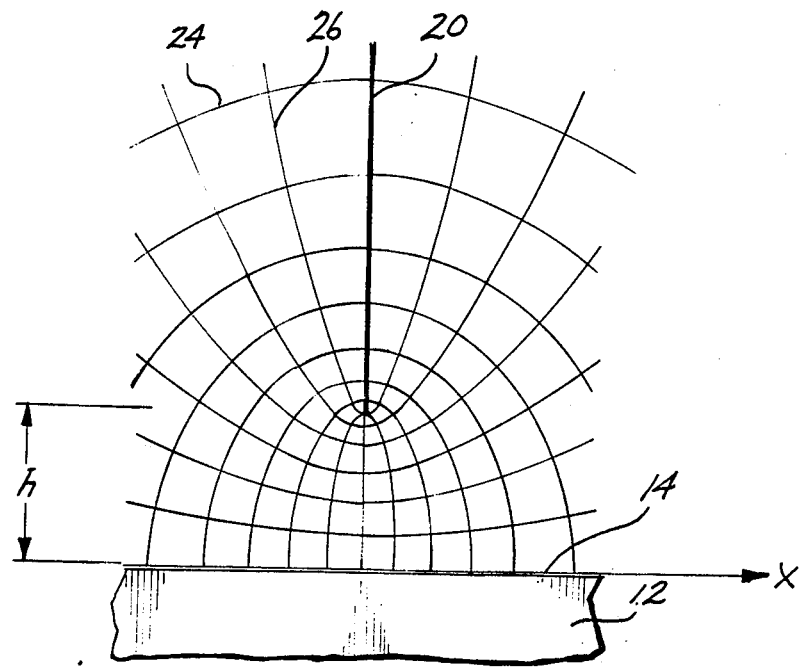
FIG. 2 is a schematic view of the electric fringe field between an electrode and a surface.

The principle of operation of the present invention is illustrated schematically in FIGS. 1 and 2. FIG. 1 illustrates body 12 having surface 14, and electrode 20 positioned a height h above the surface. Body 12, or at least the portion of body 12 adjacent surface 14, is composed of an electrically conductive material such as metal, graphite composite or the like. Electrode 20 comprises a thin metallic plate perpendicular to surface 14, the electrode having height H, width W, and thickness T. A voltage V is applied between electrode 20 and body 12, resulting in an electric field that is schematically illustrated in FIG. 2. The electric field lines 24 are perpendicular to surface 14 and to the surfaces of electrode 20, and the equipotential lines 26 are perpendicular to the electric field lines.

The electric field between the two plates of a capacitor is often described in terms of the direct field and the fringe field. The term "direct field" refers to that portion of the electric field directly between the two plates or conductors. In FIGS. 1 and 2, the direct field corresponds to the field between the lowermost edge of electrode 20 and area 16 of surface 14 directly below the electrode. For conductors oriented as in FIG. 1, the term "edge field" may be used to denote the direct field. The "fringe field" is the field that occupies the space not directly between the two conductors. As indicated in FIG. 2, as long as electrode 20 is perpendicular to surface 14 and the thickness T of the electrode is sufficiently small, the electric field between electrode 20 and surface 14 is essentially a fringe field. As a result, the total capacitance between the electrode and the surface is essentially a result of the fringe field, and the contribution of the edge field to the total capacitance is negligible.

The behavior of the sensor illustrated in FIGS. 1 and 2 may be derived from an analysis of the electric field. For an infinitely thin electrode of width W and height H displaced a distance h above an infinite plane, the fringe field capacitance C is:

$$C = \frac{4eW}{\pi} \ln\left[\frac{2H}{h}\right] \quad (1)$$

where it is assumed that the material surrounding the electrode has a uniform dielectric constant e and that electrode height H is substantially greater than distance h. The capacitance is directly proportional to the width W and inversely proportional to the logarithm of the instantaneous separation distance h. The distance between electrode 20 and surface 14 can therefore be inferred from the magnitude of the fringe field capacitance C. Equation (1) illustrates that as the distance between the electrode and the surface becomes small, the capacitance increases rapidly. The sensitivity K of the measured capacitance with respect to the average height above the surface $h_0$ is:

$$K = \frac{dC}{dh}\bigg|_{h=h_0} = \frac{4eW}{\pi h_0} \quad (2)$$

Thus the sensitivity is proportional to the electrode width W, inversely proportional to the average height $h_0$, and is independent of the electrode height H. Equation (2) further demonstrates that when $h_0$ is small, i.e., when the electrode is nearly touching surface 14, the sensitivity of the probe is high and small variations in the surface profile can be measured. The fringe field capacitive sensor of the present invention is therefore adapted for measuring the profile of a surface. Conversely, when electrode 20 is relatively far away from surface 14, the sensitiviy decreases and variations in surface profile no longer cause a detectable variation in capacitance. In this mode, the sensor becomes a macroscopic distance measuring device that can be used to detect the spacing between the electrode and the average surface. As described below, sensors comprising a plurality of electrodes can be used to measure both the geometry and surface profile of a hole, as well as the topography of a surface.

An ideal sensor for measuring surface profile would be sensitive only to the height of the surface directly beneath the electrode. However the shape of the electric field and the measured value of the capacitance are also influenced by the shape of the surrounding surface. The spatial resolution of the sensor is determined by the extent to which the shape of the surrounding surface affects a measurement at any single point. In particular, it may be shown that if electrode 20 is moved across surface 14 in a direction perpendicular to the plane of the electrode, i.e., in the X direction of FIG. 1, the measured height $h_m(x)$ above the surface at position x along the X axis is given by:

$$h_m(x) = h_0 + \Delta h_m(x) = h_0 + \int_{-\infty}^{+\infty} s(x - x') \cdot \Delta h(x') dx' \quad (3)$$

where $\Delta h_m(x)$ is the measured or inferred height variation with respect to average height $h_0$, $\Delta h(x)$ is the actual height with respect to $h_0$, and where $s(x)$ is the spatial unit impulse response function:

$$s(x) = \frac{h_0}{\pi} \cdot (x^2 + h_0^2)^{-1} \quad (4)$$

Thus the measured change in surface height $h_m(x)$ is equal to the spatial convolution of the actual surface height $h(x)$ with the spatial unit impulse response of the capacitive electrode. The measurement of the surface profile using a fringe field capacitive sensor can therefore be considered to be equivalent to a spatial filter. In the frequency domain this filter is represented by:

$$\Delta H_m(k) = S(k) \cdot \Delta H(k) \quad (5)$$

where $\Delta H_m(k)$, $S(k)$ and $\Delta H(k)$ are the Fourier transforms of the corresponding functions $\Delta h_m(x)$, $s(x)$, and $\Delta h(x)$, and where $k = 2\pi/\lambda$ is the spatial frequency of the sinusoidal component of wavelength $\lambda$. From equation (4) above:

$$S(k) = \int_{-\infty}^{\infty} \frac{h_0/\pi}{x^2 + h_0^2} \cdot e^{-jkx} dx = \exp(-h_0|k|) \quad (6)$$

The value of $S(k)$ decreases monotonically as the absolute value of k increases. The sensor therefore acts as a low-pass spatial filter, attenuating high frequency components (short wavelengths), while allowing low frequencies (long wavelengths) to pass with little change.

For some applications, the loss of high frequency components due to spatial filtering may be unacceptable. In such cases, a dynamic compensation technique may be adopted based upon equation (5) above. A single parameter, the average height $h_0$, describes the theoretical impulse response of the sensor. For any surface, $h_0$ can be estimated from a simple static calibration of the sensor. It is therefore possible to recover an improved estimate of the surface profile based upon knowledge of the dynamic characteristics of the sensor. The dynamic compensation takes the form of an inverse filter. Equations (5) and (6) above can be combined to produce:

$$\Delta h(x) = F^{-1}[\exp(-h_0|k|) F(\Delta h_m(x))] \quad (7)$$

where $F(\ )$ and $F^{-1}(\ )$ represent the Fourier transform and inverse Fourier transform respectively. Determination of $\Delta h(x)$ by this dynamic compensation technique therefore begins with measurement of $\Delta h_m(x)$ from actual capacitance measurements, using, for example, an empirical static calibration curve of capacitance versus distance. The Fourier transform of $\Delta h_m(x)$ is then computed, and the inverse filter function is estimated using a value of $h_0$ computed from the average value of $\Delta h_m(x)$. The Fourier transform of $\Delta h_m(x)$ is multiplied by the inverse filter function, and the estimated actual profile $\Delta h(x)$ may then be computed from the inverse Fourier transform. The inverse Fourier transform should be taken over a frequency range limited by the signal-to-noise ratio of the measured signal, i.e., the dynamic compensation must not be applied below the noise floor of the measurements.

Average surface roughness sensors are known that comprise a relatively wide electrode located parallel to, and in close proximity with, the conducting surface whose roughness is to be measured. The capacitance generated between these two conductors is inversely related to the average roughness of the surface. Although these sensors are well suited to manufacturing environments, only average roughness can be measured. The high spatial resolution of the fringe field sensor of the present invention allows the surfacre profile to be obtained. Knowledge of the actual profile permits the determination of high order statistics, such as skewness, kurtosis, and surface spectra. In addition, in many cases, profile measurements are required for reliable detection of individual cracks and tool gouges.

Figure 3:
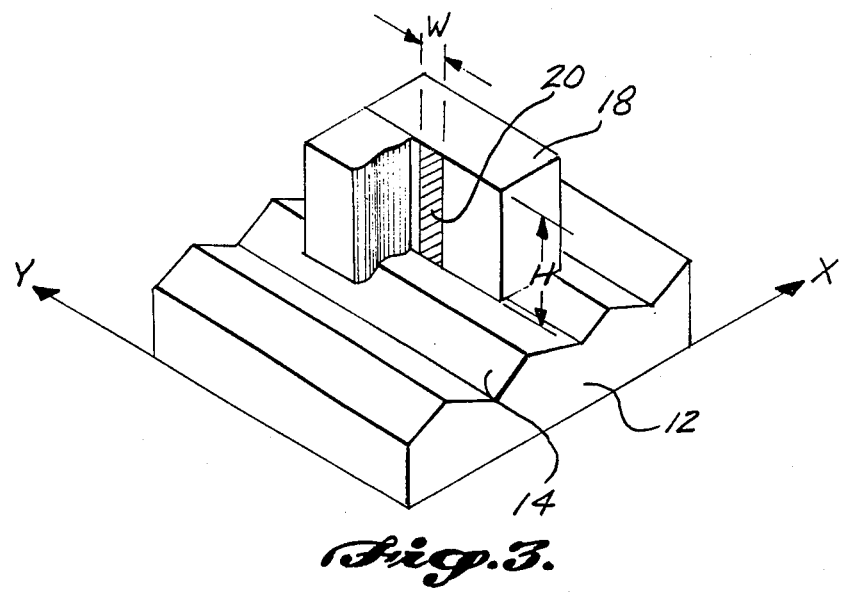
FIG. 3 illustrates the measurement of surface profile according to the present invention.

Use of the sensor of the present invention to measure surface profile is illustrated schematically in FIG. 3. The sensor for measuring the profile of surface 14 includes probe 18 and electrode 20. Probe 18 is composed of a ceramic or other insulating material, and rests directly on surface 14. Electrode 20 is embedded in probe 18 with the lower edge of the electrode flush with the lower surface of the probe. As in FIGS. 1-2, the electrode has a height H, a width W, and the thickness of the electrode (along the X axis) is much less than the height and width. The width of the electrode must be comparatively large, preferably 2 mm or more, to ensure adequate sensitivity. This consideration tends to limit the technique to surfaces with predominantly one-dimensional roughness variations. However, the majority of manufacturing operations, such as milling, turning, drilling, and shaping, produce surfaces having a parallel lay, and the profile of such surfaces may therefore be determined by the sensor of the present invention.

In FIG. 3, surface 14 extends in the X and Y directions, and has a lay parallel to the Y direction. The electrode is positioned perpendicular to the surface and parallel to the lay, and is moved relative to the surface in the X direction, i.e. in a direction normal to the lay and perpendicular to the plane of the electrode. The lower surface of probe 18 contacts surface 14, forming a skid that maintains a constant average distance between the lower tip of the electrode and the surface. As the probe moves across the surface, a suitable detection circuit, described below, measures the fringe field capacitance between the electrode and the surface. As indicated in equation (1), the capacitance varies as a function of the distance between the bottom of the electrode and the portion of surface 14 beneath the electrode. The surface profile is inferred from a record of the capacitance variation as a function of electrode position along the X axis. As shown by equation (2) above, wear of the probe and electrode caused by rubbing against the surface does not alter the sensitivity of the sensor, and is of minor importance in calibration.

As indicated above, the fringe field capacitive sensor acts as a low pass filter, attenuating high spatial frequency components while allowing low spatial frequencies to pass with little change. The width of the spatial frequency response characteristic is inversely proportional to the average height $h_0$ of the electrode above the surface. This characteristic of the fringe field capacitive sensor is an advantage, since for most machined surfaces, the average wavelength tends to decrease as the average roughness decreases. Thus, since $h_0$ also decreases as roughness decreases, the fringe field capacitive sensor provides a wider frequency response when measuring higher frequency components.

Probe 18 has to basic functions. The probe encases all but the lower edge of electrode 20, protecting the electrode from contamination and mechanical damage. The electrode and the accuracy of the profile measurement are therefore not affected by severe environmental conditions. In addition, as the probe is moved across the surface, the base of the probe broadly contacts the surface, forming a skid that maintains a constant average distance between the lower edge of the electrode and the surface. Unlike mechanical stylus devices, the profile measuring sensor of the present invention need not mechanically track fine surface variations, and the scanning speed of the probe across the surface is therefore not limited by inertial effects. Excellent results have been achieved at scanning speeds as high as 100 mm/sec.

A suitable material for probe 18 is a machinable glass ceramic material, such as the ceramic material available from Corning Glass Works under the trademark MACOR. MACOR ceramic material has good thermal stability and can be shaped by ordinary machining operations. Probe 18 is preferably constructed from two blocks of ceramic material by forming the electrode on one of the ceramic blocks using an evaporative deposition technique, and then bonding the blocks together so as to enclose the electrode. The thickness of electrode 20 should be small in comparison with the smallest surface wavelength to be measured. A suitable electrode material is silver, which has a high conductivity, good resistance to corrosion, and adheres well to ceramic material. For determining the profile of a typical machined metallic surface, a suitable electrode thickness is 0.1 micron, and suitable widths for electrode 20 are in the range of 2-5 mm. These dimensions result in a nominal sensor capacitance on the order of 0.5 picofarads.

Figure 4:
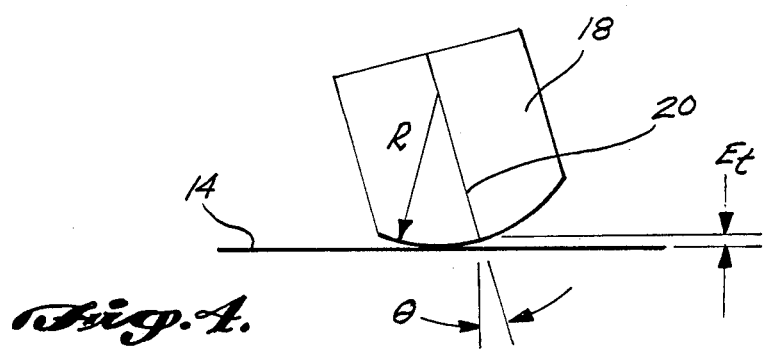
FIG. 4 is a schematic view illustrating the relationship between radius of curvature and tilt error.
Figure 5:
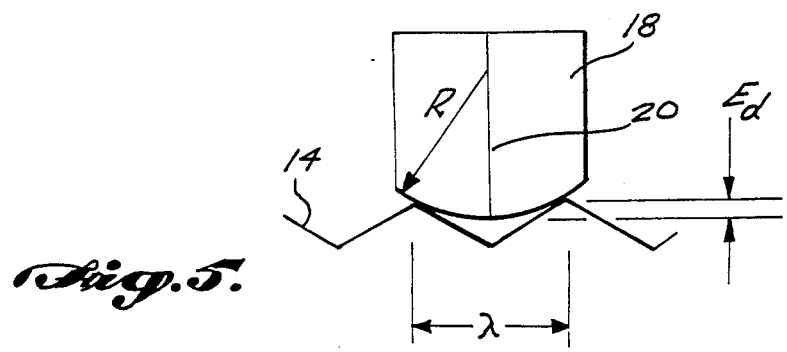
FIG. 5 is a schematic view illustrating the relationship between radius of curvature and drop-in error.

Since probe 18 is in contact with surface 14, the shape and alignment of the bottom surface of the probe are significant design considerations. The effectiveness of the skid formed by the probe is improved by curving the bottom surface of the probe in a plane parallel to the direction of travel, i.e., in a plane perpendicular to surface 14 and parallel to the X direction. As illustrated in FIGS. 4 and 5, two types of measurement error are determined by the radius of curvature of skid. FIG. 4 illustrates a tilt error that occurs when there is angular misalignment between the electrode and the direction normal to surface 14, such misalignment causing the electrode to be lifted above the surface. This tilt error $E_t$ in the height of the electrode is equal to $R \sin^2 \theta$ where $\theta$ is the angle of deviation of the electrode from the normal and R is the radius of curvature of the lower surface of the probe. The tilt error is therefore minimized by decreasing the radius R. A second source of error is the "drop-in" error illustrated in FIG. 5, and is a result of the skid riding over the surface peaks and dropping into the troughs of the surface. The drop-in error is given by:

$$E_d = R - \sqrt{R^2 - \left(\frac{\lambda^2}{2}\right)} \qquad (8)$$

where $\lambda$ is the surface wavelength. Increasing radius R therefore reduces the drop-in error. A compromise value of the radius can be selected by minimizing the combination of both errors. Since the errors are statistically independent, the expected value of the total error $E_s$, is given by:

$$E_s = \sqrt{E_d^2 + E_t^2} \qquad (9)$$

Figure 6:
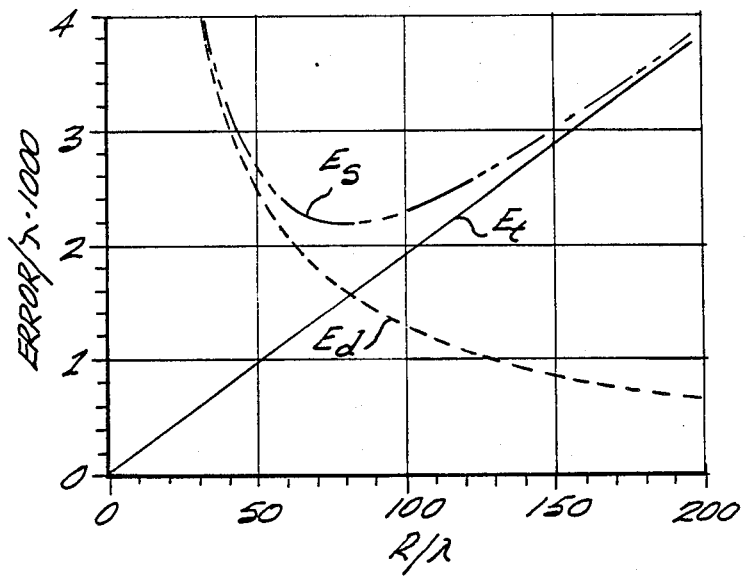
FIG. 6 is a graph illustrating selection of the minimum total error.

By way of example, FIG. 6 shows the normalized (with respect to $\lambda$) drop in error, tilt error and expected error, assuming a tilt misalignment of 0.25 degrees. The optimum value for radius of curvature R in this example is 75 microns.

Figure 7:
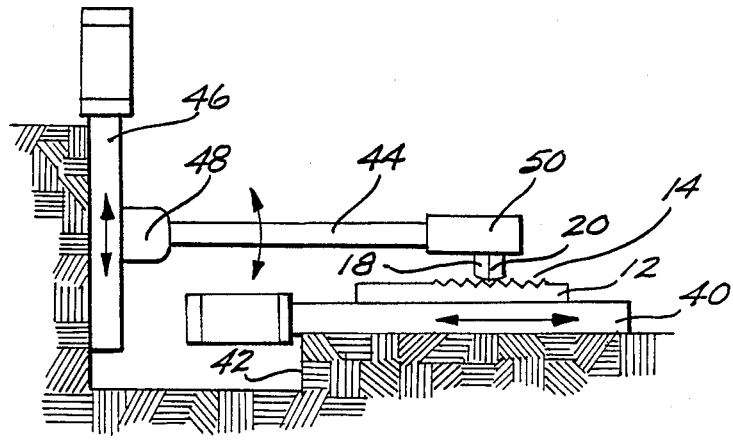
FIG. 7 is a schematic view of an apparatus for measuring the profile of a surface.

An apparatus for carrying out the surface profile measurements according to the present invention is illustrated in FIGS. 7 and 8. Referring initially to FIG. 7, conductive body 12 is mounted by horizontal translator 40 such that surface 14 whose profile is to be measured faces upward and is horizontal. Probe 18 having embedded electrode 20 is mounted by one end of arm 44, the opposite end of arm 44 being pivotally mounted to vertical translator 46 at pivot 48. The end of arm 44 to which the probe is mounted includes electronics compartment 50, described below. During measurement of the profile of surface 14, arm 44 is free to pivot about pivot 48, such that probe 18 rests against surface 14. Horizontal translator 40 moves body 12 in a horizontal direction past the probe and electrode, to produce variations in the capacitance between the electrode and the body, as described previously. The apparatus is calibrated by locking arm 44 against rotation about pivot 48, and by then causing vertical translator 46 to lift the electrode vertically away from surface 14 while capacitance measurements are made.

Referring now to FIG. 8, variable capacitor C represents the fringe field capacitance between electrode 20 and surface 14. Capacitor C is connected as an element of a multivibrator circuit comprising inverters 52 and 54 and resistors 56 and 58. As is well known, the frequency of oscillation of such a multivibrator will be proportional to capacitance C. The output of the multivibrator passes through buffer/inverter 60 and is input to phase lock loop 62. Inverters 52, 54 and 60 and resistors 56 and 58 may conveniently be mounted in electronic compartment 50 on arm 44. Phase-lock loop 62 produces an output signal on line 64 having a magnitude corresponding to the frequency of oscillation of the multivibrator, and therefore to the value of fringe field capacitance C and to the height of the electrode above the surface. The signal on line 64 is digitized by A/D converter 66, and input to microcomputer 68. Microcomputer 68 controls horizontal translator 40 by means of start/stop commands on line 70. The start/stop commands are received by horizontal control and measurement circuit 72, and result in the production of appropriate sync signals on line 74 that control movement of the horizontal translator. The horizontal translator includes an optical encoder that produces a series of pulses, each pulse corresponding to a preselected horizontal distance through which the horizontal translator has moved. Such pulses are transmitted to horizontal control and measurement circuit 72 over line 76, and result in a position signal on line 78 that is received by microcomputer 68. In a similar manner, vertical translator 46 is controlled through vertical control and measurement circuit 80 that is coupled to the vertical translator by lines 82 and 84. The vertical control and measurement circuit receives start/stop and lock/unlock commands from the microcomputer via line 86, and returns position information to the microcomputer via line 88. The lock/unlock signals on line 86 correspond to locking and unlocking of arm 44, to switch between calibration and measurement modes, respectively.

The apparatus of FIG. 7 or 8 illustrate one example of a surface profile measuring apparatus according to the present invention. It is to be understood, however, that the particular apparatus used for a given application will depend upon the nature, size and shape of the surfaces whose profiles are to be measured, as well as upon the overall manufacturing process in which the profile measuring technique is incorporated. For example in many situations, it will be more convenient to maintain the surface stationary and move the probe across the surface during a measurement. As a further example, numerous electronic techniques are available for measuring variations in fringe field capacitance C, and the multivibrator based detection circuit shown in FIG. 8 is but one example of such techniques. The frequency response of the detection circuit must be sufficient to track variations in capacitance as the sensor moves across the surface. The nature of the spectrum of the surface profile and the desired probe velocity will fix the bandwidth requirement. The nature of microcomputer 68 will also depend upon the overall environment in which the profile measuring technique is used. For demonstration and testing applications, a Fluke 2450 measurement and control system has been found suitable.

One important application of the sensor of the present invention is the inspection of drilled holes. In the aircraft and other industries, highly automated facilities have been increasingly used to locate and drill holes, and to insert and seat the fastener, e.g., the rivet or bolt, in the hole. A rapid and reliable technique for inspecting a hole between the drilling step and fastener insertion step is therefore highly desirable. The inspection technique is preferably capable of measuring the diameter of the hole in at least two perpendicular directions at closely spaced intervals along the hole axis, as well as of distinguishing between individual tool scratches and continuous finish variations. The identification of tool scratches requires measurement of surface profile rather than average roughness, and prior parallel plate capacitive techniques have therefore been found to be inadequate. As a result, prior hole inspection methods have generally required a stylus profilometer technique for surface profile and an additional, separate technique for hole geometry.

A fringe field capacitance sensor capable of measuring both hole geometry and surface profile is illustrated in FIGS. 9–11. The sensor 100 comprises an elongated structure that includes probe 102 having electrodes 104–107 embedded therein. As described below, each electrode is connected to a suitable capacitance measuring circuit. Electrodes 104 and 106 are positioned along axis 110 and electrodes 105 and 107 are positioned along axis 112, axes 110 and 112 being perpendicular to one another and both being perpendicular to longitudinal axis 114 of sensor 100. The plane of each electrode is also perpendicular to axis 114. Probe 102 is adapted for positioning in hole 116, the diameter of probe 102 being selected such that it is somewhat less (e.g., 0.5 millimeters less) than the diameter of the hole. In FIGS. 10 and 11, the diameter of hole 116 relative to probe 102 has been somewhat exaggerated for ease of illustration. Probe 102 is positioned in hole 116 such that the probe adjacent one electrode, such as electrode 106 in FIG. 11, rests directly on (i.e., is tangent to) the hole wall to make surface profile measurements, while the other electrodes are spaced from the hole wall to make distance measurements. The diameter of the hole along axis 110 can be determined by adding the spacing detected by electrode 104 to the probe diameter, while the diameter along axis 112 can be obtained by adding the distances measured by electrodes 105 and 107 to the probe diameter. Both the surface profile and geometry of hole 116 can therefore both be determined by sensor 100 by passing the probe axially through the hole, with the probe adjacent electrode 106 in contact with the hole wall. More detailed measurements can readily be obtained by providing additional electrodes, by rotating the sensor about axis 114 as the probe is moved along such axis, and/or by making multiple passes of the probe into and out of the hole.

Sensor 100 comprises probe 102, stem 118, plate 120 and sleeve 122. Probe 102 comprises disks 124 and 126, disk 126 including mounting stem 128. The disks are preferably fabricated from a ceramic material, such as MACOR. Electrodes 104-107 are deposited on face 130 of disk 126, preferably by evaporative metal deposition. In one suitable technique, chromium is first deposited to establish a good bond with the MACOR, then a layer of silver is deposited to produce a total electrode thickness of approximately 0.1 microns. Four electrodes are deposited, each 1.6 millimeters wide and oriented at an angle of 90° with respect to one another. Before the deposition process, four small wires 132 are secured using epoxy glue inside four drilled holes 125 leading to surface 130 of disk 126. As the metal is deposited, the electrodes and the wire are galvanically connected. After the deposition process, disk 124 is glued to disk 126 with epoxy, sandwiching the electrodes between the disks. The entire probe 102 can then be turned down to the desired shape on a lathe. The diameter of probe 102 is preferably approximately 1.0 millimeters or less below the nominal diameter of the hole to be measured. The relief space created by the probe diameter being less than the hole diameter provides for ease of insertion and prevents the probe from jamming inside the hole due to misalignment. The appropriate relief space is a significant parameter, because the sensitivity quickly decreases as the electrodes get farther away from the hole wall. For a given application, optimal spacing can be determined from static calibration curves.

Stem 118 comprises a stainless steel tube, the purpose of the stem being to support the probe and to serve as a shield for wires 132. Plate 120 is mounted within stem 118, and wires 132 are embedded in thin grooves along each side of the plate. A suitable material for plate 130 is Plexiglass sheet material. The wires are preferably spaced with respect to one another and with respect to stem 118 to minimize the total capacitance created by the stem and wires. Sleeve 122 provides a mounting for stem 118 and may have any suitable construction.

Figure 12:
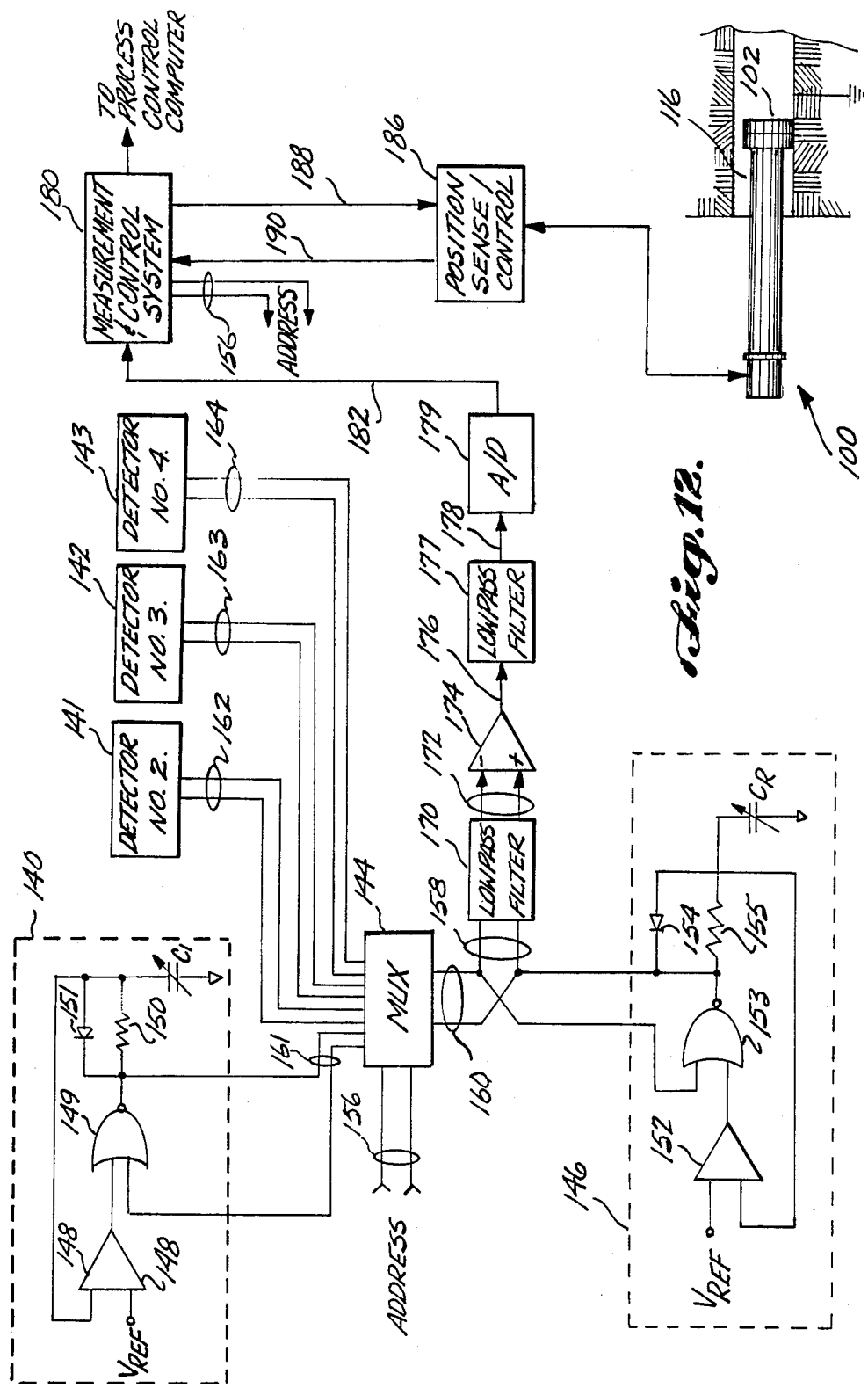
FIG. 12 is a block diagram of a system for measuring the profile and geometry of a hole.

FIG. 12 illustrates a system for measuring the geometry and surface profile of a hole by means of sensor 100. The system comprises four detector circuits 140-143, multiplexer 144 and reference circuit 146. Detector circuit 140 includes comparator 148, NAND gate 149, resistor 150, diode 151 and variable capacitance $C_1$, capacitor $C_1$ corresponding to the fringe field capacitance between electrode 104 and the body in which hole 116 has been drilled. Detector circuits 141-143 are identical to detector circuit 140, except that detector circuits 141-143 comprise variable capacitors $C_2$-$C_4$ (not shown) that correspond to the fringe field capacitance between electrodes 105-107 and the body in which hole 116 has been drilled. The body is assumed to be at ground potential.

Reference circuit 146 comprises comparator 152, NAND gate 153, diode 154, resistor 155 and variable reference capacitor $C_R$. The reference circuit is connected to multiplexer 144 through line pair 160, and detector circuits 140-143 are connected to multiplexer 144 by line pairs 161-164, respectively. In response to an address on address lines 156, the multiplexer connects line pair 160 to one of line pairs 161-164. When each detector circuit, for example detector circuit 140, is connected to reference circuit 146 by the multiplexer, the detector and reference circuits comprise a differential pulse width modulation sensor that produces a square wave output signal on line pair 158 that has a duty cycle related to the relative magnitudes of capacitors $C_1$ and $C_R$. When the output of NAND gate 149 is high, capacitor $C_1$ charges through resistor 150 until the voltage across the capacitor is equal to $V_{REF}$, at which time comparator 148 forces the output of NAND gate 149 low, whereupon capacitor $C_1$ rapidly discharges through diode 151. In a similar manner, a high output from NAND gate 153 charges capacitor $C_R$ through resistor 155 until the voltage across the capacitor is equal to $V_{REF}$, at which time comparator 152 forces the output of NAND gate 153 low, whereupon the capacitor rapidly discharges the diode 154. Voltage $V_{REF}$ may be set to any convenient value, such as one-half of the supply voltage. The square wave output on line pair 158 will therefore be in one state (e.g. high) for a time determined by the size of capacitor $C_1$, and will be in the opposite state (e.g. low) for a time corresponding to the magnitude of capacitor $C_R$. The frequency of the square wave signal on line pair 158 is typically on the order of 200-300 kilohertz.

Lowpass filter 170 averages the signal on line pair 158 to produce a slowly varying differential signal on lines 172 that is converted by differential amplifier 174 into a single ended analog signal on line 176. The signal is again filtered by lowpass filter 177 to produce an analog signal 178 that is converted to a digital capacitance signal by A/D converter 179. The resulting capacitance signal on line 182 is input to measurement and control system 180.

Measurement and control system 180 may comprise a Fluke 2450 measurement and control system or its equivalent. The measurement and control system controls the movement of sensor 100 into and out of hole 116 via position sense/control circuit 186, movement commands being transmitted to the position sense/control circuit via line 188, and signals indicative of sensor movement being transmitted to measurement and control system 180 via line 190. The measurement and control system also controls multiplexer 144 via address lines 156 to cause the multiplexer to selectively activate the detector circuits. During the time that a particular detector circuit is activated, the measurement and control system determines and stores the distal capacitance signal on line 182, and the corresponding probe position. The capacitance and position data may be processed directly by the measurement and control system, and/or transferred to a process control computer via a serial data link.

The capacitance signal produced by each detector circuit 140-143, for example detector circuit 140, is an essentially linear function of the capacitance $C_1$ as long as $C_R$ is selected to be of approximately the same magnitude as $C_1$. The amplitude V of the capacitance signal on line 182 may therefore be written:

$$V = A + B \ln(h) \tag{10}$$

The constants A and B may be obtained by routine calibration techniques. For example, the probe 102 and electrode 106 can be positioned above the polished surface of a straight hole, and the signal on line 182 can then be recorded every 0.4 microns as a function of vertical displacement. The coefficients A and B can then be determined by a suitable least squares curve fit technique.

Equation (1) is a good approximation of the capacitance C for comparatively small values of h. However when h is on the order of or greater than the electrode height H, the capacitance is given by:

$$C = \frac{4eW}{\pi} \ln \frac{H + \sqrt{H^2 + h^2}}{h} \tag{11}$$

The signal amplitude V is then $$V = A' + B' [\ln(H + \sqrt{H^2 + h^2}) - \ln(h)] \tag{12}$$

The three variables A', B' and H is equation (12) are adjusted iteratively until the least squares error is a minimum. The electrode height H is treated as an unknown because of the complex geometry of the ground surfaces around the electrode.

Figure 13:
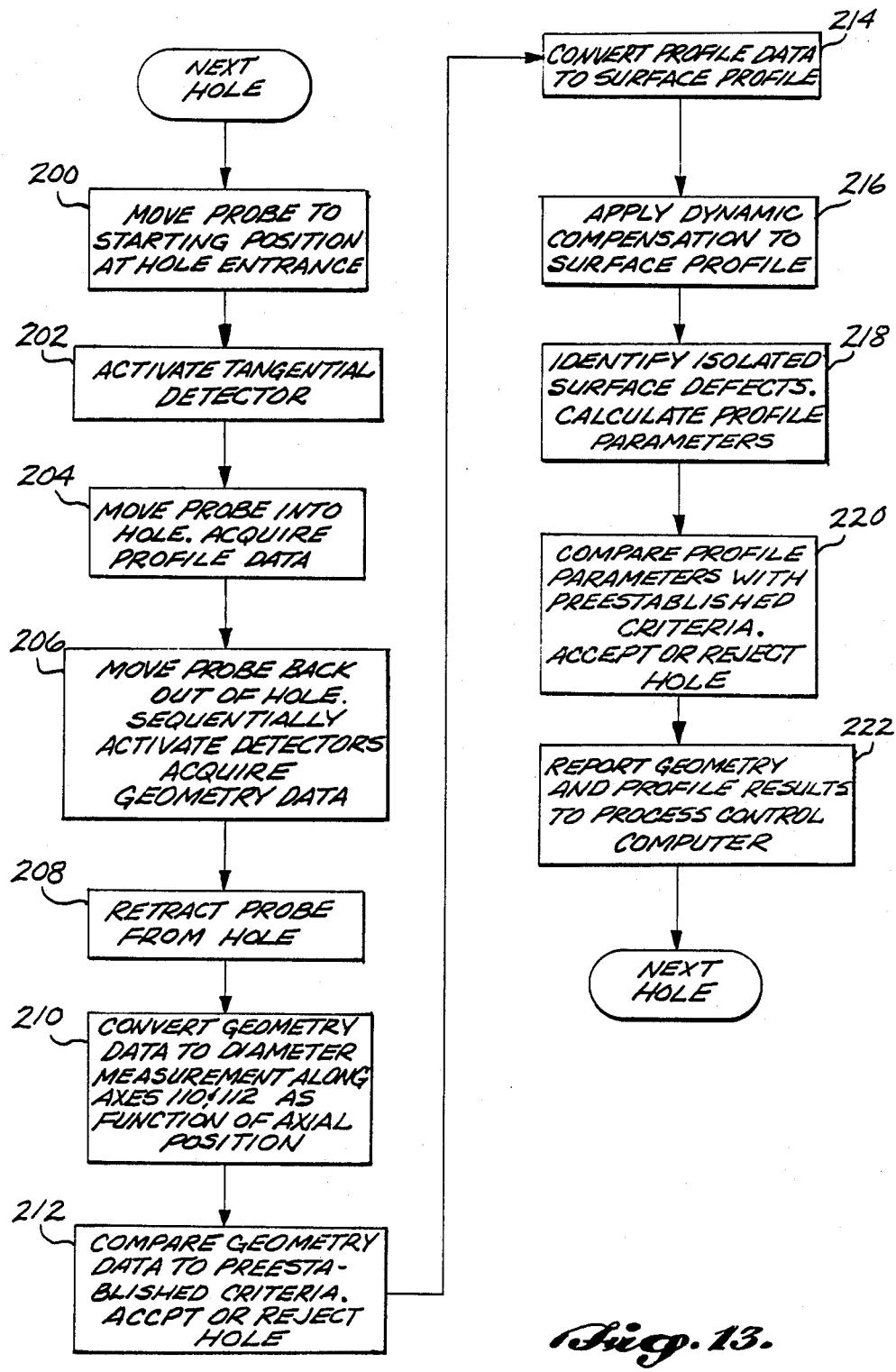
FIG. 13 is a block diagram of the operation sequence of the hole sensor of FIG. 12.

FIG. 13 sets forth a suitable sequence of operations for measurement and control system 180. The system commences inspection of a new hole at block 200 by moving the probe to a starting position at the hole entrance. The starting position is adjusted such that one of the four electrodes, e.g., electrode 106, is positioned tangent to the hole surface. In blocks 202 and 204, detector circuit 140 corresponding to tangential electrode 106 is first activated by means of an appropriate command on address lines 156, and the probe is then moved into the hole. During movement of the probe into the hole (forward motion phase), raw surface profile data is acquired at equal distance increments, for example every 5 micrometers, along the axis of the hole.

When the probe has reached the required depth in the hole, probe motion is reversed at block 206, and the probe begins to move back out of the hole. During this reverse motion phase, detector circuits 140-143 are activated sequentially by multiplexer 144 in response to addresses supplied by the measurement and control system. Each time a detector circuit is activated, the measurement and control system acquires and stores the raw distance data, such data acquisition occurring, for example, every 50 microns along the hole axis. At the end of the reverse motion phase, the probe is retracted from the hole at block 208. The sequential activation of the detector circuits, such that only one such circuit is activated at any one time, prevents crosstalk and interference between the measurements made through the several electrodes, and is a preferred aspect of the present invention.

In block 210, the measurement and control system converts the raw geometry data acquired during the reverse motion phase into diameters along axes 110 and 112 by means of equation (12), such diameters being tabulated as a function of distance along the hole axis. At block 212, the refined geometry data is compared with preestablished criteria, and a decision is made whether to accept or reject the hole. The actions (if any) taken at this point upon hole rejection depend upon the particular process in which the probe is employed. In any case if the hole is accepted, the measurement and control system proceeds at block 214 to convert the raw profile data acquired during forward motion phase into a surface profile by converting the frequency measurements into heights by means of equation (10). The surface profile data may then be refined in block 216 by means of a dynamic compensation technique exemplified by equation (7). In block 218, the refined surface profile data is examined to identify isolated surface defects. Profile parameters, such as skewness, kurtosis and surface spectra may also be determined at block 218. The results of the analysis in block 218 are compared with preestablished criteria in block 220, and a decision is made to accept or reject the hole. In block 222, the geometry and profile results are reported to a process control computer, and inspection of the hole is complete.

The sensor of the present invention is suitable in many circumstances for measuring surface topography, i.e., the macroscopic shape and contour of a surface. For example, many composite structures are formed from layers of graphite fiber "tape" impregnated with epoxy resin. The tape is typically 100 microns thick and 150 millimeters or more wide. The width of the gap between adjacent tapes is an important parameter in determining the overall quality of the composite structure. The tapes are layed down by high-speed automated equipment. Since each layer of tape is eventually covered by another layer, the task of measuring the gap between adjacent tapes must be accomplished during the tape lay-down process. The continuous measurement of the gap width is useful both for process monitoring and for control of the lay-down operation. The width of the gap may vary from less than 0 (i.e., overlap) to 7 millimeters or more. The required accuracy of the gap measurement is on the order of 100 microns. Surface contamination, low contrast, and mechanical vibrations have heretofore limited the application of optical methods of imaging and measuring the gap width.

Figure 14:
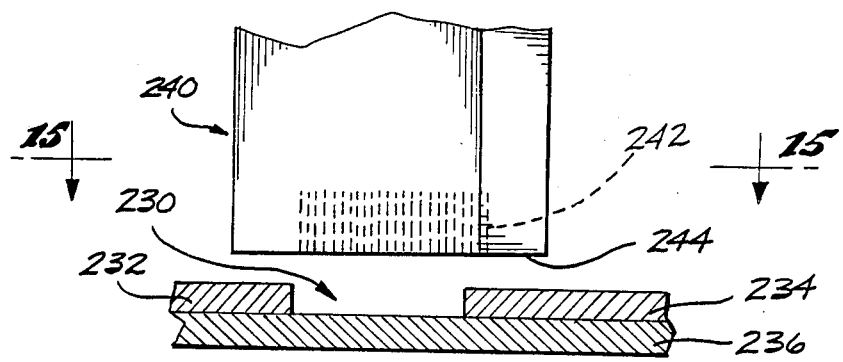
FIG. 14 is a cross-sectional view of an apparatus for measuring the width of a gap.
Figure 15:
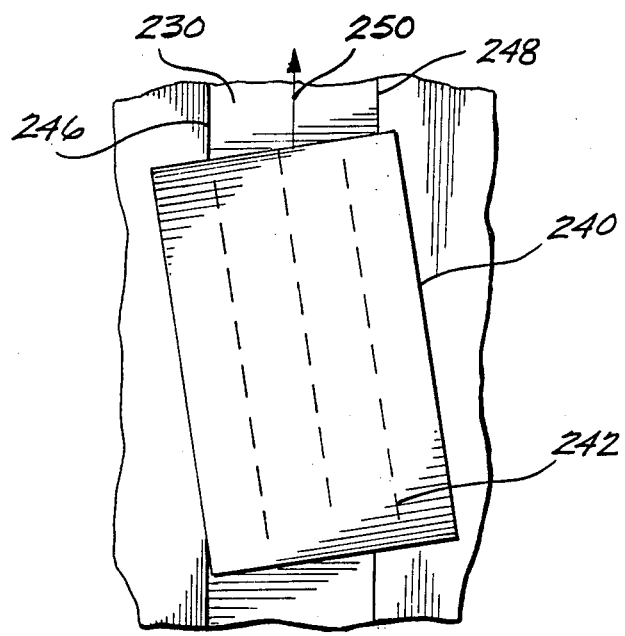
FIG. 15 is a cross-sectional view of the apparatus of FIG. 14.

The measurement of a gap width amounts to an assessment of the surface topography on a line across the gap. A suitable gap measuring system using fringe field capacitance sensors is illustrated in FIGS. 14 and 15. FIG. 14 illustrates gap 230 formed between graphite tapes 232 and 234 that have been layed down on underlying tape 236. The gap width is measured by a sensor comprising ceramic probe 240 in which a plurality of electrodes 242 are embedded. The electrodes are aligned parallel to one another in three rows, as indicated in FIG. 15, each electrode being perpendicular to lower surface 244 of probe 240 and to the top surfaces of tapes 232, 234 and 236. The staggered arrangement allows wider electrodes for increased sensitivity, and diminishes cross-coupling between the electrodes.

Each electrode extends to and is flush with lower surface 244. The probe is inclined with respect to the boundaries 246, 248 of gap 230 such that the electrodes are spaced from one another in a direction normal to such boundaries. In particular, the inclination of the probe and the spacing of the electrodes within the probe are such that the electrodes are evenly spaced from one another along a measurement direction perpendicular to boundaries 246 and 248, as indicated in FIG. 14. Electrodes 242 are each connected in a suitable capacitance measuring circuit, such as the detector circuits shown in FIG. 12. The detector circuits are sequentially activated, and the distance from each electrode to the underlying surface is determined as probe 240 moves along the gap in the scanning direction indicated by arrow 250. For example, probe 240 may be positioned and moved directly behind the apparatus for laying down the tapes. An image is thereby produced of the height of the surface along the measurement direction as a function of position along the gap. As predicted by equation (4) above, this image becomes sharper as the probe is moved closer to the underlying surface. The imge may be processed by appropriate techniques to determine the positions of boundaries 246 and 248, from which the width of gap 230 as a function of position along the gap may be determined. A suitable technique for locating the positions of boundaries 246 and 248 is to locate the point at which the height changes most rapidly with respect to distance along the measurement direction.

FIGS. 14 and 15 illustrate one specific application of the present invention to the measurement of surface topography. It will be appreciated, however, that numerous variations will be appropriate for different applications. For example, a single electrode could be scanned along a surface (e.g. back and forth across a gap) to measure the width of a gap or other features of a surface. Stationary or moving arrays of electrodes can readily be constructed to optimize the measurement of any required surface shape.

While the preferred embodiments of the invention have been illustrated and described, it should be understood that the variations will be apparent to those skilled in the art. Accordingly, the invention is not to be limited to the specific embodiments illustrated and described, and the true scope and spirit of the invention ought to be determined by reference to the following claims.

The embodiments of the invention in which an exclusive property or privilege is claimed are defined as follows:

1. An apparatus for determining a measured profile of a body surface of a conductive body along a scanning direction across the body surface, the apparatus comprising:
    a probe having one end shaped to form a skid adapted to move across the body surface in contact therewith;
    a conductive plate element mounted by the probe and having a fixed position relative to the probe, the thickness of the plate element being substantially less than the height and width of the plate element, the plate element including an edge parallel to the width dimension of the plate element;
    positioning means for positioning the probe such that the skid contacts the body surface, such that the edge is positioned in a generally parallel relationship to the body surface, and such that the plate element is normal to the body surface, the positioning means including external means for causing relative movement between the probe and the body such that the skid moves in a scanning direction across the body surface, the scanning direction being normal to the plate element and independent of any guiding conformation on the body surface; and
    measurement means for measuring the fringe field capacitance between the plate element and the body at a plurality of probe positions along the scanning direction, to thereby determine the measured profile of the body surface along the scanning direction.

2. The apparatus of claim 1, wherein the measurement means comprises dynamic compensation means for processing the measured profile to produce an estimate of the actual profile.

3. The apparatus of claim 1, wherein the skid is curved along a direction parallel to the scanning direction, and wherein the radius of curvature of the skid is selected so as to minimize the combination of the misalignment error and the drop-in error.

4. The apparatus of claim 1, wherein the body surface has a lay having a characteristic wavelength, and wherein the positioning means includes means for causing the scanning direction to be perpendicular to the lay, such that the width of the plate element is parallel to the lay.

5. The apparatus of claim 4, wherein the width of the plate element along said edge is in the range of 2–5 mm.

6. The apparatus of claim 4, wherein the thickness of the plate element is substantially smaller than the characteristic wavelength.

7. The apparatus of claim 1, wherein the plate element is embedded in and encased by the probe except where the skid contacts the body.

8. The apparatus of claim 7, wherein the probe comprises two blocks of ceramic material having respective joining surfaces, the plate element being deposited on one of the joining surfaces, the blocks being bonded to one another at their respective joining surfaces.

9. A method for determining a measured profile of a body surface of a conductive body along a scanning direction across the body surface, the method comprising:
    providing a probe having one end shaped to form a skid adapted to move across the body surface in contact therewith, and a conductive plate element mounted by the probe and having a fixed position relative to the probe, the thickness of the plate element being substantially less than the height and width of the plate element, the plate element including an edge parallel to the width dimension of the plate element;
    positioning the probe such that the skid contacts the body surface with the plate element normal to the body surface and normal to the scanning direction, and such that the edge is positioned in a generally parallel relationship to the body surface, and causing relative movement between the probe and the body such that the skid moves in the scanning direction across the body surface independent of any guiding conformation on the body surface; and
    measuring the fringe field capacitance between the plate element and the body at a plurality of probe positions along the scanning direction, to thereby determine the measured profile of the body surface along the scanning direction.

10. The method of claim 9, comprising the further step of dynamically compensating the measured profile to produce an estimate of the actual profile.

11. The method of claim 9, wherein the body surface has a lay having a characteristic wavelength, and wherein the scanning direction is perpendicular to the lay, such that the width of the plate element is parallel to the lay.

12. An apparatus for measuring the size and a measured profile of an opening in a conductive body along a measurement direction, the apparatus comprising:

a probe having probe axis and adapted to be inserted in the opening;

two plate elements mounted by the probe such that the plate elements are parallel to one another and normal to the probe axis, the plate elements being spaced apart from one another in a direction normal to the probe axis, the thickness of each plate element being substantially less than the height and width o the plate element, each plate element including an edge parallel to the width dimension of the plate element;

positioning means for positioning the probe such that the probe is approximately normal to the measurement direction and such that the plate elements are within the opening and positioned adjacent to and normal to respective body surfaces thereof such that each edge is positioned in a generally parallel relationship to its respective body surface, and such that adjacent one plate element, the probe contacts the respective body surface, the body surfaces being spaced apart from one another along the measurement direction, the positioning means including means for causing relative movement between the probe and the body such that the probe moves within the opening along a scanning direction parallel to the probe axis; and measurement means for measuring the fringe field capacitance between each plate element and the body at a plurality of probe positions along the scanning direction, to thereby determine the distance between each plate element and its respective body surface as a function of probe position along the scanning direction so that the size of the opening along the measurement direction and a measured profile of the body surface associated with said one plate element are measured using a single probe.

13. The apparatus of claim 12, wherein the measurement means comprises a detection circuit associated with each plate element, each detection circuit being adapted to measure the capacitance between the body and the plate element associated with the detection circuit, and means for selectively activating the detection circuits for making capacitance measurements such that no more than one detection circuit is activated at any given time.

14. The apparatus of claim 12, wherein the measurement means comprises dynamic compensation means for processing the measured profile of the body surface to produce an estimate of the actual profile of the body surface.

15. The apparatus of claim 12, wherein the body surfaces have a common lay having a characteristic wavelength, and wherein the positioning means includes means for causing the scanning direction to be normal to the lay, such that the width of the plate element is parallel to the lay.

16. The apparatus of claim 15, wherein the width of each plate element along its edge is in the range of 2-5 mm.

17. An apparatus for determining the geometry and a measured profile of a hole in a conductive body, the apparatus comprising:

a probe adapted to be inserted in the hole;

four conductive plate elements mounted by the probe, the thickness of each plate element being substantially less than the height and width of the plate element, each plate element including an edge parallel to the width dimension of the plate element, and means for moving the probe along a scanning direction parallel to the probe axis; and positioning means including means for positioning the probe such that the plate elements are within the opening, and such that each edge is positioned in a generally parallel relationship to a respective body surface and such that the probe adjacent a selected plate element contacts the body surface and means for moving the probe along a scanning direction parallel to the probe axis; and measurement means including for measuring the fringe field capacitance between each plate element and the body at a plurality of probe positions along the scanning direction, to thereby measure the dimension of the hole along the first and second measurement axes and the measured profile as a function of probe position along the scanning direction.

18. The apparatus of claim 17, wherein the measurement means comprises a detection circuit associated with each plate element, each detection circuit being adapted to measure the capacitance between the body and the plate element associated with the detection circuit, and means for selectively activating the detection circuits for making capacitance measurements such that no more than one direction circuit is activated at any given time.

19. The apparatus of claim 17, wherein the width of each plate element along its edge is in the range of 2-5 mm.

20. The apparatus of claim 19, wherein the thickness of each plate element is approximately 0.1 microns.

21. A method for measuring the size and measured profile of an opening in a conductive body along a measurement direction, comprising:

providing a probe having a probe axis and adapted to be inserted in the opening, the probe including two plate elements parallel to one another and normal to the probe axis, and spaced apart from one another in a direction normal to the probe axis, the thickness of each plate element being substantially less than the height and width of the plate element, each plate element including an edge parallel to the width dimension of the plate element;

positioning the probe such that the probe axis is approximately normal to the measurement direction, such that the plate elements are within the opening and positioned adjacent to and normal to respective body surfaces thereof and such that adjacent one plate element, the probe contacts the respective body surface, such that edge is positioned in a generally parallel relationship to its respective body surface, the body surfaces being spaced apart from one another along the measurement direction;

causing relative movement between the probe and body such that the probe moves within the opening along a scanning direction parallel to the probe axis; and measuring the fringe field capacitance between each plate element and the body at a plurality of probe positions along the scanning direction, to thereby determine the distance between each plate element and its respective body surface along the measurement direction as a function of probe position along the scanning direction and the size of the opening along the measurement direction and a measured profile of the body surface associated with said one plate element using a single probe.

22. The method of claim 21, wherein the fringe field capacitance is measured by a detection circuit associated with each plate element, and wherein the detection circuits are selectively activated for making capacitance measurements such that no more than one detection circuit is activated at any given time.

23. The method of claim 21 comprising the further step of dynamically compensating the measured profile to produce an estimate of the actual profile.

24. The method of claim 23, wherein the body surfaces have a common lay having a characteristic wavelength, and wherein the scanning direction is perpendicular to the lay, such that the width of each plate element is parallel to the lay.

25. The method of claim 24, wherein the width of each plate element along its edge is in the range of 2-5 mm.

26. A method for determining the geometry and a measured profile of a hole in a conductive body, the method comprising:

providing a probe adapted to be inserted in the hole, the probe including four conductive plate elements, the thickness of each plate element being substantially less than the height and width of the plate element, each plate element including an edge parallel to the width dimension of the plate element, the plate elements being parallel to one another, the direction normal to the plate elements defining a probe axis, a first pair of plate elements being spaced apart along a first measurement axis normal to the probe axis, and a second pair of plate elements being spaced apart along a second measurement axis normal to the probe axis and to the first measurement axis;

positioning and moving the probe such that the plate elements are within the opening, such that each edge is positioned in a generally parallel relationship to a respective body surface, and such that the probe adjacent a selected plate element contacts the body surface, and such that the probe moves along a scanning direction parallel to the probe axis; and measuring the fringe field capacitance between each plate element and the body at a plurality of probe positions along the scanning direction, to thereby measure the dimensions of the hole along the first and second measurement axes and the measured profile as a function of probe position along the scanning direction.

27. The method of claim 26, wherein the fringe field capacitance is measured to a detection circuit associated with each element, each detection circuit being adapted to measure the capacitance between the body and the plate element associated with the detection circuit, and wherein the detection circuits are selectively activated for making capacitance measurement such that no more than one detection circuit is activated at any one time.

28. An apparatus for determining the shape and a measured profile of a surface of a body along a measurement direction, comprising:

a probe;

a plurality of conductive plate elements mounted by the probe, the thickness of each plate element being substantially less than the height and width of the plate element, each plate element including an edge extending along the width of the plate element;

positioning means for positioning the probe adjacent the surface such that the plate elements are normal to the surfafce and such that each edge is positioned in a generally parallel relationship to the body surface, adjacent at least one plate element, the probe contacting the body surface, the plate elements being spaced from one another along the measurement direction; and measurement means for measuring the fringe field capacitance between each plate element and the body, to thereby measure the distance between each plate element and the body and along said at least one plate element, to determine the measured profile of the body surface adjacent thereto using a single probe.

29. The apparatus of claim 28, further comprising means for moving the probe parallel to the surface in a scanning direction normal to the measurement direction, to thereby measure the shape of the surface at a plurality of positions along the scanning direction.

30. The apparatus of claim 29, wherein the measurement means comprises a detection circuit associated with each plate element, each detection circuit being adapted to measure the capacitance between the body and the plate element associated with the detection circuit, and means for selectively activating the detection circuits for making capacitance measurements such that no more than one detection circuit is activated at any one time.

31. The apparatus of claim 29, wherein the plate elements are parallel to one another.

32. The apparatus of claim 31, wherein the plate elements are aligned with one another in a plurality of parallel rows, the rows being inlined with respect to the direction normal to the measurement direction such that the plate elements of each row are spaced from one another along the measurement direction.

33. A method for measuring the shape of a surface of a body and determining a measured profile of the body surface along a measurement direction, the method comprising:

providing a probe having a plurality of conductive plate elements mounted by the probe, the thickness of each plate element being substantially less than the height and width of the plate element, each plate element including an edge extending along the width of the plate element;

positioning the probe adjacent the surface such that the plate elements are normal to the surface and such that each edge is positioned in a generally parallel relationship to the body surface, the probe adjacent at least one plate element contacting the body surface, the plate elements being spaced from one another along the measurement direction; and measuring the fringe field capacitance between each plate element and the body, to thereby measure the distance between each plate element and the body and to determine the measured profile of the body surface adjacent said at least one plate element using a single probe.

34. The method of claim 33, comprising the further step of moving the probe parallel to the surface in a scanning direction normal to the measurement direction, to thereby measure the shape of the surface at a plurality of positions along the scanning direction.

35. The method of claim 34, wherein the plate elements are parallel to one another.

* * * * *

UNITED STATES PATENT AND TRADEMARK OFFICE
CERTIFICATE OF CORRECTION

PATENT NO. : 4,814,691

DATED : March 21, 1989

INVENTOR(S) : J.L. Garbini et al.

It is certified that error appears in the above-identified patent and that said Letters Patent is hereby corrected as shown below:

Column 8, line 11, "to" should be --two--

Column 13, line 37, "is" should be --in--

Column 17, line 22 (Claim 12), "o" should be --of--

Column 19, line 65 (Claim 27), "to" should be --by--

Column 20, line 46 (claim 32), "inlined" should be --inclined--

Signed and Sealed this

Nineteenth Day of December, 1989

Attest:

JEFFREY M. SAMUELS

Attesting Officer  Acting Commissioner of Patents and Trademarks